Oct. 23, 1973   O. WICHTERLE ET AL   3,767,759

METHOD OF MOLDING CAPILLARY DRAIN FOR SURGERY

Filed May 19, 1971

OTTO WICHTERLE
LUBOMÍR KREJČÍ
INVENTORS

BY
ATTORNEY

3,767,759
METHOD OF MOLDING CAPILLARY DRAIN
FOR SURGERY
Otto Wichterle and Lubomír Krejčí, Prague Czechoslovakia, assignors to Ceskoslovenska Akademie Ved, Prague Czechoslovakia
Filed May 19, 1971, Ser. No. 144,806
Claims priority, application Czechoslovakia,
May 27, 1970, 3,706/70
Int. Cl. B29c 1/08, 1/12
U.S. Cl. 264—313    7 Claims

ABSTRACT OF THE DISCLOSURE

Method of molding a capillary drain consisting of a flat bundle of capillaries made from hydrogels and suitable particularly for treating glaucoma in ophthalmology wherein the drain is manufactured so that a system of parallel fibers or filaments is laid between parallel plates separated from each other by flat thin separating inserts or gaskets. An initiated monomer mixture suitable producing water-swellable cross-linked hydrogels is filled into the mold obtained and the monomer mixture is polymerized under cross-linking conditions. The mold is dismounted and the fibers or filaments are removed by dissolving or melting or pulling them out.

BACKGROUND OF THE INVENTION

Glaucoma was treated hitherto by a filtering or draining process, using various implants such as tantalum or platinum wires, nylon fibers or capillary tubings and the like. The results of such operations were mostly unsatisfactory and most experiments were carried out on test animals. Only a few operations on human patients have been recorded. Extended follow-up of the patients should in most cases either block around the area of the drain or block the drain itself as a result of high proliferation, or, in some cases, intoleration of such implants and their eventual elimination.

According to the invention, novel drains free of the above-mentioned shortcomings are manufactured in the form of flat capillary bundles from physiologically inert hydrogels containing about 40% by weight or more of water in swollen condition. The manufacture is carried out using a mold consisting of a system of parallel inert plates (e.g. glass plates separated from each other by thin gaskets in which a layer of parallel fibers or filaments are laid between each two plates). The cavities of the system are then completely filled with a monomer mixture capable of polymerizing to a cross-linked hydrogel, or, alternatively, by a monomer mixture which may be, upon polymerization, transformed to a hydrogel by a suitable chemical reaction such as partial hydrolysis or the like. After polymerization is finished mold is dismounted and the fibres, the ends of which are exposed, are removed by pulling them out or by dissolving them in a suitable solvent which does not adversely affect the polymer, or by melting them out. The drain thus obtained is then washed and sterilized.

The mold itself also forms a part of this invention. It is clear that the simplest mold will consist of two plates having a size corresponding to a single drain. A composite mold consisting of more than two plates, e.g. of 3 to 21 plates, is economically more suitable, however, the size of which plates may be a multiple of that off a single drain. Thin gaskets are inserted between the two opposite edges of the plates. The gaskets may be made from any suitable inert material such as paper, plastic foil or metal sheet or foil. Between each two neighboring plates a layer of parallel fibers is laid. The whole system is held together by any appropriate means such as a nylon or rubber filament, metal or plastic clasps or clips, or by Scotch tape.

The size of the drains and the thickness of the fibers and gaskets depend on the desired end use. For ophthalmic drains for treating glaucoma, the flat capillary bundle used as a drain is from 2 to 4 mm. wide and from 4 to 10 mm. long, depending upon the kind of operation. One millimeter of a capillary bundle with capillaries from 0.08 to 0.1 mm. thick corresponds to about 9 parallel capillaries, assuring, if fore chamber and subconjunctival space (or suprachorioidal space) are tapped, filtering off not only the chamber water, but also particles occurring during the operation or in the postoperational period in fore chamber, e.g. blood cells, inflammatory cells or exudation.

Experimental testing of the operation with an implant manufactured according to the invention was carried out on rabbits (total number of operated eyes amounting to 150). There were used two different methods of draining operations:

(1) Connection of fore chamber with subconjunctival space with a filter cushion being formed; and (2) Modified cyclodialysis with the fore chamber being connected with the suprachorioidal space.

The advantages of these new types of operations using the implants of the invention may be summarized as follows:

(a) The material introduced into the eye interior is inert and as well is compatible with living tissue;

(b) The draining ability of the implant is quite sufficient as it was proved by repeated experimental provocation of glaucomatosic fits in various periods of time;

(c) Histologic tests at various time intervals from one to twelve months showed a very good incorporation of the implants in operative incision, with but small scar tissue formation. The capillaries of the implant were not blocked by cells and proliferating tissue did not grow along the implant into the fore chamber. Using the other type of operation—modified cyclodialysis—the retina and the uvea never became loose.

Favorable results of animal tests made possible transition human patients. Fifteen successful operations were carried out on humans. The pressure in the eye interior decreased and the eyes, previously very painful, were calmed and the patients are subjectively free of complaint. Objective findings clearly show that these kinds of operations, using drains according to the invention, may be used in ophthalmology in indicated cases.

The invention is further illustrated by the annexed drawing wherein

Figure 1:
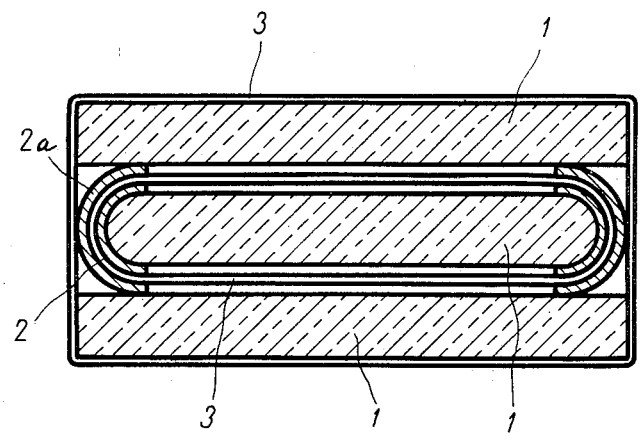
FIG. 1 shows a cross section through the mold.

The mold in FIG. 1 consists of three plates 1, the middle one forming a partition between two covering ones. The plates may be glass, e.g. diapositive glass plates 50 x 50 mm. Two opposite edges of the middle plate are provided with flexible inserts 2 made from paper. Around the flexible inserts there is wound very tightly in a single layer a nylon monofilament 0.03–0.2 mm. thick. The filament is wound parallel with the two free edges of the plates. Further separating inserts 2a are laid on the filaments along the edges perpendicular to the winding and the two covering glass plates are fixed on these inserts by winding a filament tightly around the mold as a whole.

The mold may, of course, consist of more plates and inserts than shown in FIG. 1 of the drawing.

Figure 2:
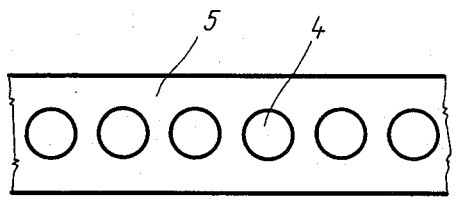
FIG. 2 shows an enlarged cross section of the finished drain.

The finished drain (FIG. 2) made of the hydrophilic gel 5 contains capillary passages 4, formed by removing the filaments after the polymerization.

Further details of the invention are shown by the following examples, which, however, are representative and not limitative.

In the examples all parts and percents are by weight unless otherwise stated.

EXAMPLE 1

Two strips of paper were folded over two opposite edges of a 50 x 50 mm. glass plate and a nylon 6 monofilament 0.08 mm. thick was wound round the plate so that the windings were 0.1 mm. apart. Similar strips of paper were folded over the winding along the edges perpendicular to the filament. Both sides were covered by similar glass plates 50 x 50 mm. and the whole was fastened together by means of a nylon 6 monofilament, wound tightly around the assemblage. A monomer mixture was prepared from 60 parts by weight of hydroxyethyl methacrylate, containing 0.25% of ethylene glycol dimethacrylate, 40 parts of anhydrous glycerol and 0.3 part of di-isopropyl percarbonate. The mixture was shortly degasified at ambient temperature, using 1 torr vacuum, and then filled into the mold. The filled mold was put into an oven heated to 70° C. and filled with carbon dioxide. After 25 minutes the mold was taken out, the covering glass plates scratched on their surfaces and broken by several sharp blows. The mold was then put into 60° C. water for several hours. The broken glass was then easily loosened. After several further hours of keeping the mold in warm water the hydrogel with all nylon 6 filaments was cut off with a sharp knife along the paper strips and left in distilled water overnight to remove glycerol. The swelled foil thus obtained was immersed for 15 hours into a 40% sulfuric acid, the paper covered edges having been previously cut off. The foil was lightly pressed between two glass plates so that the capillaries were lying perpendicularly, and 40% sulfuric acid was slowly poured onto the top at such a rate that it flowed but through the capillaries. Only the first portions of the eluate contained some polyamide, which was precipitated in a surplus of water. To be sure that all nylon was removed, about 10 ml. of dilute sulfuric acid was flowed through the capillaries. The acid was then fully removed by washing in distilled water and the drain immersed into physiologic sodium chloride solution until swelling equilibrium was attained. The resulting drain was 0.75 mm. thick, with capillaries having 0.17 mm. diameter. The thickness of the hydrogel between the capillaries was from 0.01 to 0.05 mm., the outer wall being about 0.2 mm. thick. The sterilized drain was used for treating glaucoma.

EXAMPLE 2

The process described in Example 1 was repeated except that a Scotch tape was used instead of paper strips, the thickness of the tape being from 0.05 to 0.06 mm. The monomer mixture consisted of 6 parts by volume of hydroxyethyl methacrylate, containing 0.3% of glycol dimethacrylate, 4 parts of glycerol and 0.04 part of di-isopropyl percarbonate. Instead of nylon filament, a similar monofilament from oriented polyester from adipic acid and ethylene glycol, 0.1 mm. thick, was used. The filament was removed from the finished hydrogel by melting out in boiling water.

EXAMPLE 3

The process according to Example 1 was repeated except that paper 0.095 mm. thick was used as a separating insert and nylon filament was replaced by a 0.06 mm. thick filament of chlorinated polyvinyl chloride. After the polymerization was completed, the filament was dissolved by means of an acetone-ethyl alcohol mixture. The monomer mixture consisted of 21 parts by volume of hydroxyethyl methacrylate (containing 0.42% of dimethacrylate), 14 parts by volume of glycerol and 0.14 part by volume of di-isopropyl percarbonate.

EXAMPLE 4

In accordance with the process described in Example 1 a mold of the same kind was prepared using glass fibres 0.1 mm. thick and 20 mm. long, made from a glass which was fully soluble in hydrofluoric acid. The fibres were glued on the central plate by means of a viscous solution of sodium polyacrylate. A monomer mixture which consisted of a 68% aqueous zinc chloride solution (concentration 70% by weight), 10% of acrylonitrile, 20% of acrylamide, 0.1% of ammonium persulfate, 0.1% of potassium metabisulfite was employed, the latter redox constituents being added in the form of 10% aqueous solutions. Prior to adding the redox initiator, the solution was cooled down to −10° C. The polymerization was performed at −5° C. ambient temperature and last 3 hours. Zinc chloride was washed out by distilled water, its first portions being acidified to pH 2 with hydrochloric acid. Last traces of zinc were removed in a 0.5% sodium hydrocarbonate aqueous solution. The glass fibres were pulled out. In those cases where all fibres could not be pulled out, the whole assemblage was immersed into dilute hydrofluoric acid until the glass fibers were fully dissolved. The drain was then thoroughly washed in distilled water and put into sterile physiologic solution. It could be used in the same way as drains made according to foregoing examples.

It is clear that other physiologically inert hydrogels can be used for the same purpose, such as gels made from polymers and copolymers of acrylamide, methacrylamide, alkyl substituted acrylamide or methacrylamide, acrylic or methacrylic acid, with the addition of methacrylonitrile or acrylonitrile as an essentially non-hydrophilic monomer to control the swelling degree in water. Further possible co-monomers are vinyl pyrrolidone, glycidyl methacrylate, esters of acrylic and methacrylic acids with lower aliphatic alcohols etc. Advantageously, the proportion of the less hydrophilic monomer is chosen so that the content of water in the hydrogen at swelling equilibrium in neutral solutions is from about 30 to about 85%, and preferably from about 40 to about 60% by weight.

As cross-linking agents, any stable more-than-polyfunctional monomer can be used, such as N,N-methylenebis-methacrylamide, divinyl sulfone, triacryloyl perhydrotriazine etc. If acrylonitrile, acrylamide or acrylic acid are polymerized or copolymerized at a concentration of 20–50% by weight in a solvent with a very low chain transfer constant such as concentrated nitric acid or aqueous zinc chloride solution, no cross-linking agent need be added because cross-links are formed by chain transfer onto the monomer. Polyacrylonitrile gel obtained by polymerization of acrylonitrile in said inorganic solvents is then transformed into hydrogel by partial hydrolysis resulting in a block copolymer of acrylonitrile, acrylamide and a small portion of acrylic acid. Hydrogels thus obtained display very high strength and elasticity, combined with good compatibility with living tissue.

Drains according to the invention may be used in surgery not only in treating glaucoma, but in all cases where discharging of body liquids is necessary, such as exudations from sick organs, operation wounds etc.

What we claim is:

1. Method of manufacturing capilliary drains for surgery from a monomer mixture, particularly for treating glaucoma, comprising the steps of winding filaments, not capable of bonding to the mixture, into a system of parallel filaments about at least one plate provided with thin separating inserts folded over its two opposite parallel edges and other thin separating inserts folded over the winding at the same edges, fixing at least one end plate and two other plates to both sides of said separating inserts to form a mold, filling a monomer mixture capable of forming a physiologically inert hydrogel into said mold, polymerizing the mixture under cross-linking conditions, removing the mold, removing the filaments and thoroughly washing the drain.

2. Method according to claim 1, wherein said filaments are nylon and are removed by dissolving them in an acid.

3. Method according to claim 1, wherein said filaments are glass fibers and are removed by dissolving them in diluted hydrofluoric acid.

4. Method according to claim 1, wherein said filaments are synthetic filaments with a low melting point and are removed by melting them out.

5. The method according to claim 1 wherein soluble filaments are employed.

6. The method according to claim 1 wherein said filaments are meltable under heat.

7. The method according to claim 1 wherein said filaments are resilient.

References Cited
UNITED STATES PATENTS 2,976,576   3/1961   Wichterle _____ 264—317 X ROBERT F. WHITE, Primary Examiner T. P. PAVELKO, Assistant Examiner U.S. Cl. X.R.

249—122, 123, 129, 176, 183; 264—317